United States Patent [19]

Fisher

[11] Patent Number: 4,555,254
[45] Date of Patent: Nov. 26, 1985

[54] MATERIAL COLLECTOR AND DISCHARGER APPARATUS

[75] Inventor: Chester D. Fisher, Muncy, Pa.

[73] Assignee: Koppers Company, Inc., Pittsburgh, Pa.

[21] Appl. No.: 445,495

[22] Filed: Nov. 30, 1982

[51] Int. Cl.[4] .................. B01D 45/14; D21C 1/02; D21B 1/16
[52] U.S. Cl. ........................... 55/345; 55/340; 55/393; 55/395; 55/398; 55/400; 55/430; 162/28; 162/47; 406/173
[58] Field of Search .............. 55/1, 21, 340, 345, 55/393, 395, 398, 400, 430, 466; 162/28, 47; 241/28, 244; 414/217, 219, 221; 415/203–206; 406/173

[56] References Cited

U.S. PATENT DOCUMENTS

| | | | |
|---|---|---|---|
| Re. 30,409 | 9/1980 | Borsheim | 55/430 |
| 816,460 | 3/1906 | Geisendorfer et al. | 55/430 |
| 885,206 | 4/1908 | Verrell | 55/466 |
| 2,325,221 | 7/1943 | Bretzlaff et al. | 415/205 |
| 2,672,822 | 3/1954 | Smith | 415/206 |
| 2,738,855 | 3/1956 | Fallon et al. | 55/345 |
| 4,136,831 | 1/1979 | Cederquist et al. | 162/28 |
| 4,207,139 | 6/1980 | Haikkala et al. | 162/28 |
| 4,235,665 | 11/1980 | Reinhall et al. | 162/28 |
| 4,253,857 | 3/1981 | Fisher | 55/430 |
| 4,326,913 | 4/1982 | Mattsson | 162/47 |

FOREIGN PATENT DOCUMENTS

| | | | |
|---|---|---|---|
| 674578 | 6/1966 | Belgium | 55/430 |
| 2941504 | 5/1980 | Fed. Rep. of Germany | 162/28 |

*Primary Examiner*—David L. Lacey

[57] ABSTRACT

In a pressurized materials processing system, separation of solid particulates from a gaseous process fluid is beneficially accomplished by use of a swept orifice discharger comprised of a cylindrical housing that is closed at one end and open at the other end. The housing contains an impeller within its interior and has a selected, presized orifice in its cylindrical side wall. In operation, the solid material and gaseous fluid are received in the swept orifice discharger housing and the solid material is continuously centrifugally urged toward the housing side wall so that it separates from the gaseous process fluid and collects on the housing side wall. Contemporaneously, the impeller continuously sweeps the collected solid material past the orifice, to avoid plugging of the orifice opening, while the pressurized gaseous fluid, which is continuously maintained at desired elevated pressure, blows the collected material through the presized orifice opening with only a controlled or predetermined minor portion of the available pressurized gaseous fluid. The remaining, clean or substantially particle-free, pressurized gaseous process fluid may then be recycled in the processing system or otherwise conserved, if desired.

4 Claims, 10 Drawing Figures

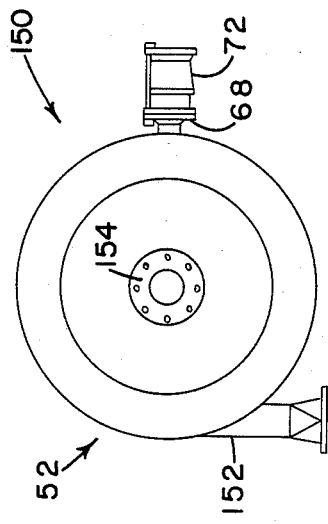
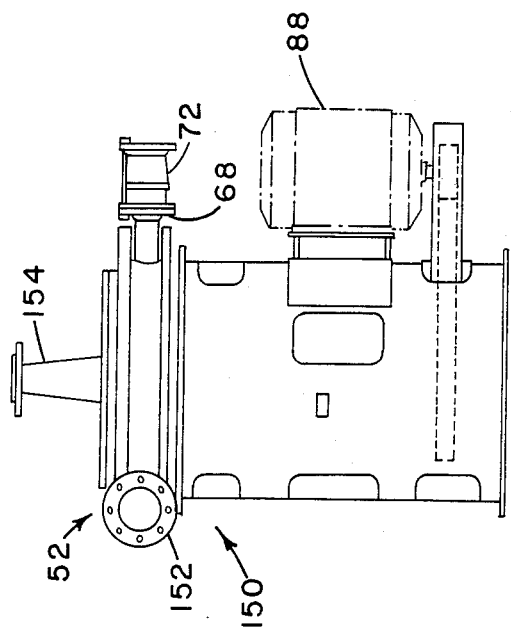
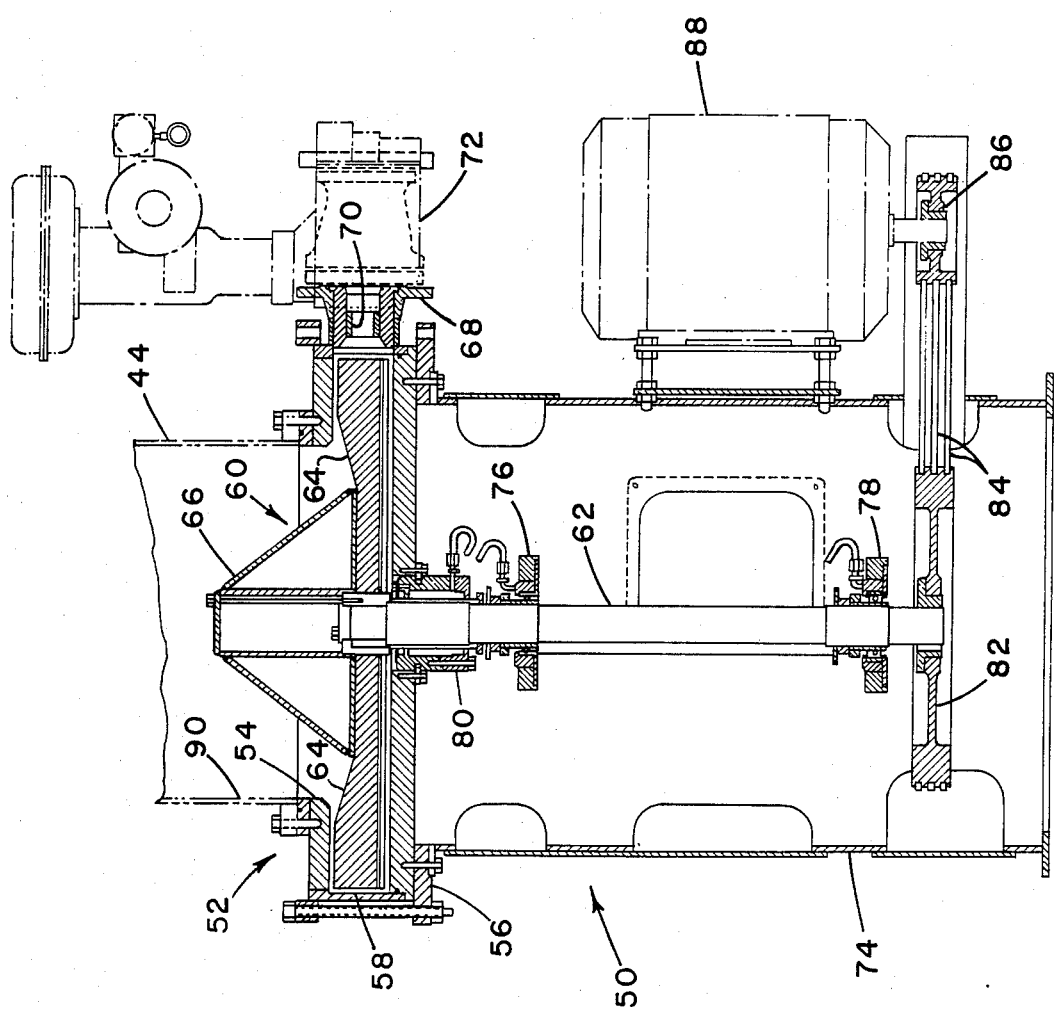

MATERIAL COLLECTOR AND DISCHARGER APPARATUS

BACKGROUND OF THE INVENTION

1. Field of the Invention

This invention relates to a process and apparatus for separating particulate solids from a gaseous process fluid in a pressurized materials processing system. The invention also contemplates conserving and/or recycling the major portion of the gaseous process fluid for both energy conservation and economy of operation. Specifically, the invention has particular application to pulping systems used in the pulp, paper and board (fiberboard, hardboard, particleboard, chipboard, etc.) industries.

2. Description of the Prior Art

In, for example, the processing of lignocellulose pulp from wood chips, sawdust, rejects, semi-chemically cooked chips, etc., under conditions of full steaming tube or digester pressure, e.g., pressurized or thermo-mechanical refining, it has been the practice over the years to separate the refined pulp or fibers from the steam (or essentially steam) processing fluid at atmospheric pressure. This was generally accomplished by means of a single cyclone separator or other material separator apparatus, such as that disclosed in applicant's U.S. Pat. No. 4,253,857, assigned to the assignee of the present invention and herein incorporated by reference.

However, with the advent of a more recent interest in or demand for the use of higher pressure steam refining of lignocellulose pulp, e.g., up to 180 p.s.i.g. or higher, the need for an approach other than the use of an atmospheric cyclone separator or applicant's aforesaid patented separator became evident. Moreover, it has become evident that any newly developed technology for fulfilling such desiderata should be energy efficient.

Notwithstanding, the approaches heretofore offered as a solution to the above problem involved considerable additional apparatus and expense, in addition to process control or balancing problems. Some of such prior approaches included, inter alia, using cyclone separators in series, pressure vessels, rotary valves, plug dischargers, high density pumps, gear pumps, compressor screw feeders, cell feeders, or the like in various combinations with the basic pressurized or thermo-mechanical pulping apparatus. Typical examples of some such approaches are disclosed in U.S. Pat. Nos. 4,136,831 and 4,235,655, among others.

A need has therefore arisen for an improved process and apparatus for economically and efficiently separating fiber from steam or the like in a pressurized or thermo-mechanical pulping system and, in addition, such a process and apparatus that is also energy efficient.

BRIEF SUMMARY OF THE INVENTION

According to the present invention, in a pressurized materials processing system, such as pressurized refining for the board industry or thermo-mechanical refining for the pulp and paper industry, separation of solid particulates from a gaseous process fluid is advantageously accomplished by use of a swept orifice discharger. The swept orifice discharger is comprised of a cylindrical housing that is closed at one end and open at the other end and also contains an impeller within the housing and a selected, presized orifice discharge in its cylindrical side wall.

In operation, the solid material and gaseous fluid, such as steam, are received in the swept orifice discharger housing and the solid material is continuously centrifugally urged toward the housing side wall so that it separates from the gaseous process fluid and collects on the housing side wall. Contemporaneously, the impeller continuously sweeps the collected solid material past the orifice, to prevent plugging of the orifice opening, while the pressurized gaseous fluid, which is continuously maintained at desired elevated pressure, blows the collected material through the discharge orifice with only a controlled or predetermined minor portion of the system's available pressurized gaseous fluid. The remaining clean or substantially particle-free, pressurized gaseous process fluid may then be recycled in the processing system or otherwise conserved, if desired.

BRIEF DESCRIPTION OF THE DRAWINGS

FIG. 3 is vertical section through the swept orifice discharger of FIG. 2, showing interior and other details of its preferred structure.

FIG. 4 is a side elevation of an alternate discharger of the invention primarily for use in pulping incident to manufacture of fiberboard and the like.

FIG. 5 is a top plan view of the discharger of FIG. 4.

DESCRIPTION OF THE PREFERRED EMBODIMENTS

Figure 1:
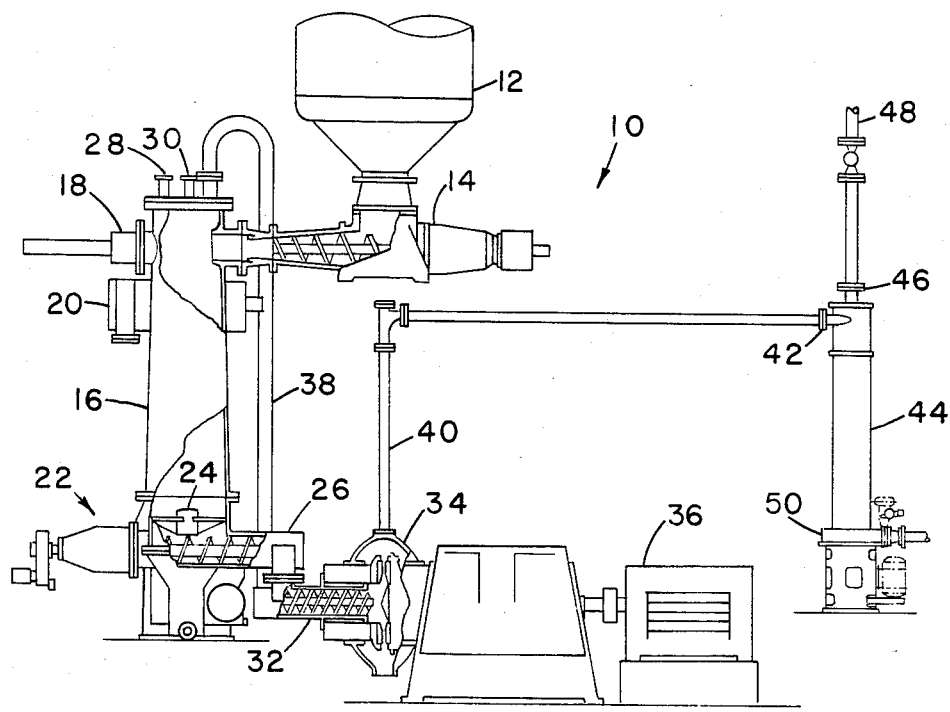
FIG. 1 is a typical, pictorial arrangement of pulping apparatus in accordance with this invention.

Referring to the drawings, and in particular to FIG. 1, there is shown a typical pictorial arrangement of thermo-mechanical pulping apparatus 10 that may be used in the manufacture of paper pulp or the like according to this invention. The pulping apparatus 10, as shown, includes a raw material or wood chip feed hopper 12, which may be a vibrating feed hopper, operatively connected to a plug screw feeder 14 to feed raw wood chips or the like into steaming tube 16. As is conventional in the apparatus of applicant's assignee, steaming tube 16 is provided with a blow back valve 18, a chip level controller 20, and a chip discharger 22 comprised of a rotary agitator 24 and a laterlly spaced pair of metering screws 26 (one of which is shown). Suitable flanged fittings, as indicated at 28 and 30, are provided on the removable top cover of steaming tube 16 for make-up steam and a pressure relieve valve.

Preheated and softened chips are fed from the steaming tube 16, by means of the metering screws 26, into a ribbon feeder 32 or the like forming the material inlet for a pressurized or a thermo-mechanical refiner 34 having a main drive motor 36. The principle of operation of pressurized or thermomechanical refiners is well known to those skilled in the art and, accordingly, is not deemed to require elaboration for the purpose of understanding the presently disclosed invention. Recycled steam or pressure equalizing steam is conventionally fed from the refiner 34 or its environs back to steaming tube 16 by means of a pressure equalizing line, indicated at 38.

In a paper pulping operation, as shown at 10, the refined pulp exits refiner 34 through a blow line 40 and is fed by the system's steam pressure to the inlet 42 at the top or upper portion of a cyclone separator 44. As is conventional, the top of the cyclone separator 44 has a steam or gaseous fluid exhaust outlet 46 that may be connected, as shown, to a suitable exhaust line or conduit 48. Again, the operation of cyclone 44 is conventional and, accordingly, not deemed to require elaboration. The refined solid material or lignocellulose pulp is substantially separated from its accompanying entrainment of gaseous fluid or steam, in cyclone 44, from which it exits with some of the accompanying gas at elevated pressure into a swept orifice collector and discharger 50 of this invention, while the major portion of the separated gas or steam exits the cyclone's exhaust outlet 46.

Figure 2:
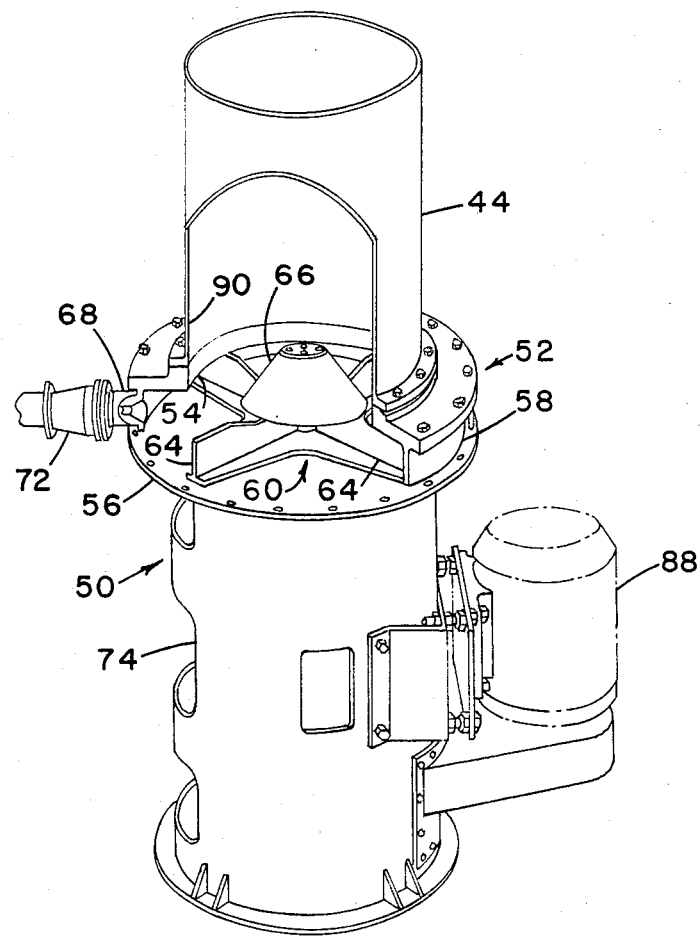
FIG. 2 is a perspective, partly broken away, of one embodiment of a swept orifice discharger of the invention.

Turning now to FIGS. 2 and 3, in conjunction with FIG. 1, the structure and operation of the swept orifice collector and discharger 50 will be explained in detail. The discharger 50, shown, has a cylindrical housing 52 provided with an open end 54 and a closed end 56. Contained within said housing 52 and mounted on a vertical drive shaft 62, that extends through closed end 56, is a rotary blade impeller 60 comprised of a plurality of blade 64. For reasons that will be clear hereinafter, impeller 60 has a blade width at its free end that is slightly narrower than the width of the cylindrical side wall 58 of housing 52 and a blade reach closely approximating the inner diameter of said side wall 58. Affixed to and mounted centrally of impeller 60 is an upstanding frusto-conical body member 66, for the purpose of better distributing pulp entering housing 52 from cyclone 44 and for desirably maintaining the standing vortex in cyclone 44, as well as maintaining said vortex centrally of the cyclone.

Mounted centrally of the side wall 58, of housing 52, is an orifice assembly 68 that has a replaceable orifice body member 70. The axis of the bore of body member 70 is perpendicular to the axes of the cyclone 44 and the rotary blade impeller 60. The replaceable body member 70 may have a bore or discharge orifice opening of any desired diameter but for the general purposes disclosed will desirably have an effective daimater of from $\frac{1}{2}$ to 4 inches.

Shown mounted exteriorly of orifice assembly 68, or exteriorly of the discharge orifice opening of replaceable orifice body member 70, is a proportioning valve 72 which may preferably be a Fisher V100 Vee Ball ® valve manufactured by Fisher Controls of Marshalltown, Iowa, and as set forth in their bulletin reference 51.3:V1OO. The prime purpose or function of this proportioning valve is to be available to modulate the preselected or presized orifice opening of replaceable orifice body member 70, for system balance and for effecting the desired flow rate of solid lignocellulose material through the orifice. It will be understood that the use of proportioning valve 72 is not essential to, but is a desirable adjunct to, the operation of the swept orifice discharger 50, for fine tuning of its operation. It will also be understood that proportioning valve 72 may be used alone, without the orifice body member 70, to establish a desired discharge orifice opening, but it should be recognized that wear from abrasive pulp could seriously diminish the useful life of this relatively expensive valve, as compared to a relatively inexpensive replaceable orifice body member. Accordingly, it is considered desirable to use a replaceable body member 70 and a proportioning valve 72 in series, as shown, if trimming of the discharge orifice opening is necessary or desirable.

As will be apparent from the drawings, swept orifice collector and discharger 50 is shown mounted on cylindrical base 74, of any suitable construction, having supported therein by means (not shown) an upper bearing 76 and lower bearing 78, to journal thereto the drive shaft 62 of impeller 60. Also shown is a pressure seal means 80 mounted to the closed end 56 of housing 52 at the external juncture of drive shaft 62 with said housing, to seal against egress of solid material or pressurized fluid from housing 52 along shaft 62. Any suitable seal means that is effective for this purpose may be employed. Also shown at the distal end of drive shaft 62 is a shaft driving sheave 82 connected by belts 84 to the drive sheave 86 of a drive motor 88, which is suitably mounted, as shown, on the outside surface of cylindrical base 74. The drive motor 88 and sheaves 82 and 86 are suitably selected to preferably permit rotation of impeller 60 at a speed of from about 200 to 1,500 RPM. Finally, there is shown in the drawings of this embodiment of the invention, the solid material exit portion 90, of cyclone 44, being fixed by a flanged member to a companion flange or a flange adaptor connected to the open end 54 of the swept orifice collector and discharger housing 52.

In the foregoing, as well as subsequent embodiment of this invention, a solid lignocellulose material is refined in a conventional manner in a steam or other gaseous fluid environment in a pressurized refiner system, such as shown in FIG. 1, and an admixture or entrainment of the refined solid material and pressurized gaseous fluid is conveyed by the system pressure to a solid material collecting and discharging station. In the embodiment of FIG. 1 thermo-mechanical pulping (TMP), as it is understood in the industry, is contemplated. In such a pulping system, normally operating at a system pressure of some 20–60 p.s.i.g., considerable steam is produced such that it is desirable, in order to minimize the size of swept orifice collector and discharger 50, to pass the entrainment or admixture first through a cyclone separator. As aforesaid, the refined solid material or lignocellulose pulp is substantially separated from its accompanying entrainment of gaseous fluid or steam in the cyclone, from which it then exits with some of the accompanying gas, at elevated pressure, into the swept orifice collector and discharger. The major portion of the separated gas or steam exits the cyclone through its exhaust outlet.

In the swept orifice discharger and collector, the impeller continuously centrifugally urges the received solid material toward the housing cylindrical side wall where it collects. Contemporaneously, the impeller continuously sweeps the collected solid material past the side wall orifice opening, to prevent plugging of the opening, while a predetermined minor portion of the pressurized gaseous fluid in the housing blows the solid material through the collector and discharger's presized orifice opening into a suitable receptacle (not shown). Moreover, during the entire operation, the pressure of the gaseous fluid within the collector and discharger's housing is continuously maintained at or near the system's elevated pressure such that continuous and consistently uniform operation of the device is assured.

Referring now to FIGS. 4-7, swept orifice collector and discharger devices of this invention are shown that are particularly adapted to pressurized refining systems of the nature conventionally employed in the manufacture of fiberboard and the like products. In such a system, generally referred to as a medium density fiberboard (MDF) system, the system's operating parameters are somewhat different than its sister TMP system. Specifically, the system pressure is generally higher, e.g., in the range of about 100–180 p.s.i.g. or higher, and less steam or gaseous process fluid is produced. Accordingly, it is generally neither necessary nor desirable to precede the use of a swept orifice collector and discharger of this aspect of the invention with the use of a cyclone separator and, notwithstanding, there is provided a collector and discharger device that is moderate in size and cost when compared to existing alternatives.

With particular reference to FIGS. 4 and 5, there is shown a swept orifice collector and discharger 150 that is particularly adapted for MDF systems or the like, the interior structure, drive, etc. of which, as well as the exterior profile or elevation of which is essentially identical to the swept orifice collector and discharger of FIGS. 1-3. Three specific differences exists. First, the frusto-conical body member 66 shown in FIGS. 2 and 3 is not present in the device of FIGS. 4 and 5 since, as aforesaid, use of a cyclone is not contemplated. Secondly, and also related to the contemplated absence of use of a cyclone, a tangential admixture or entrainment inlet conduit 152 is preferably provided in the cylindrical side wall of its housing. Thirdly, and correlated to the new inlet at 152, there is provided a restricted opening comprising a gaseous fluid outlet or exit conduit 154 centrally of the top of the housing as shown. In other respects, where like numerals have been applied, like structure to that shown in FIGS. 1-3 is contemplated, including the use of proportioning valve 72 of which only the valve body portion is shown, i.e., illustration of its control portion has been eliminated for sake of convenience.

The operation of the swept orifice collector and discharger 150 of FIGS. 4 and 5 proceeds by introducing the admixture or entrainment of refined lignocellulose material and pressurized gaseous fluid from the blow line of a refiner directly into inlet conduit 152 and then, with an impeller 60 (not shown), continuously centrifugally urging the received solid material toward the housing's cylindrical side wall, where it collects. Contemporaneously, the impeller continuously sweeps the collected solid material past the opening in the side wall orifice assembly 68, to prevent plugging of the opening, while a predetermined minor portion of the pressurized gaseous fluid in the housing blows the solid material through the collector and discharger's presized orifice opening. In this instance, the major portion of the separated gas or steam from the entrainment exits the collector and discharger through the gas outlet or exit conduit 154. As before, and during the entire operation, the pressure of the gaseous fluid within the collector and dischargers housing is continuously maintained at or near the system's elevated pressure such that continuous and consistently uniform operation of the device is assured.

Figure 7:
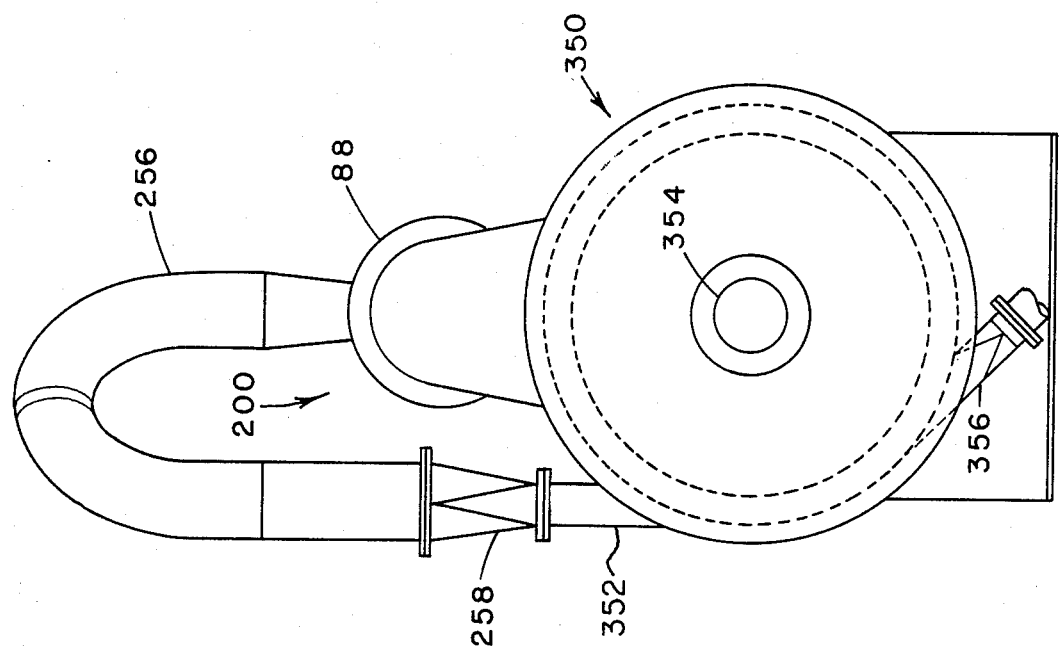
FIG. 7 is right side elevation of the discharger of FIG. 6 showing additional details of its construction.
Figure 6:
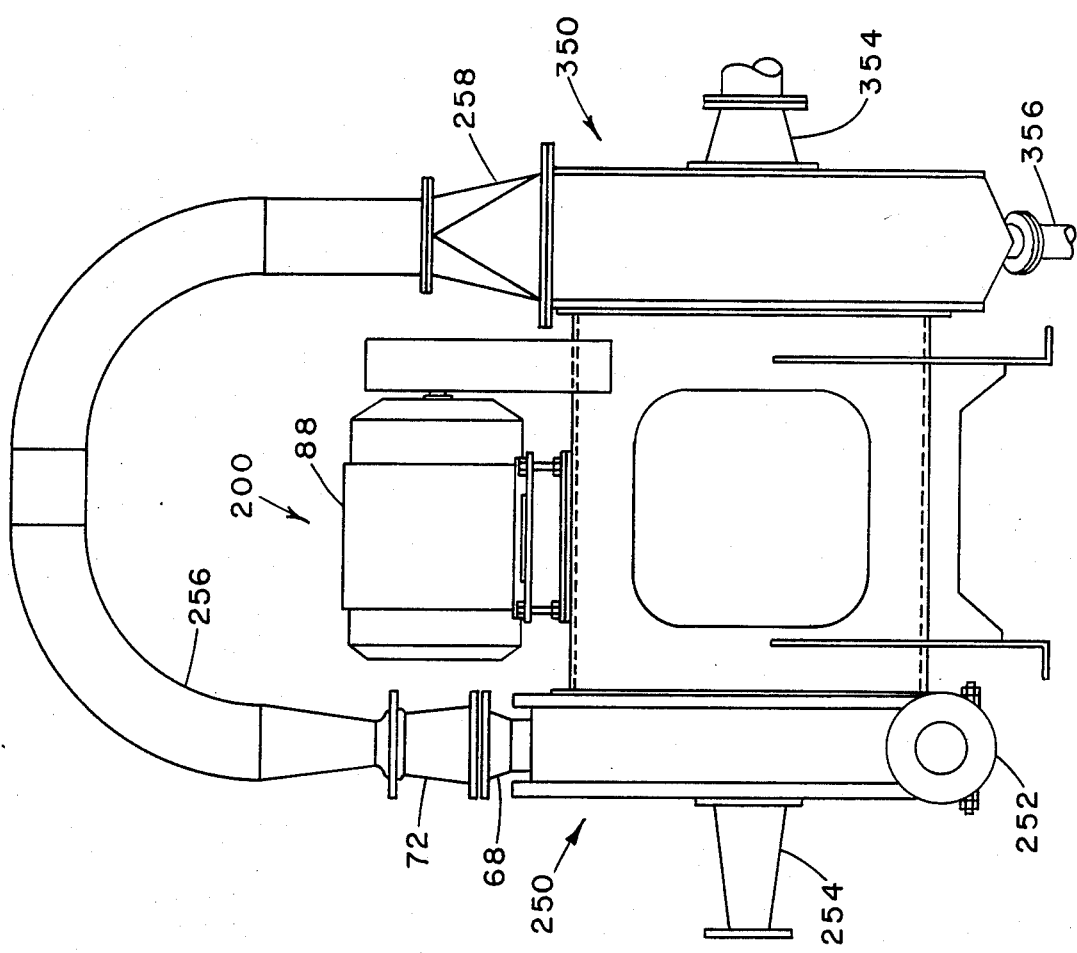
FIG. 6 is a side elevation of a further alternate discharger of the invention, also primarily for use in pulping incident to the manufacture of board products.

Turning now to FIGS. 6 and 7, shown is a horizontal, tandem arrangement 200 of swept orifice collector and dischargers 250 and 350 that again is particularly adapted for MDF systems or the like. The structure of each collector and discharger 250 and 350 is substantially identical, with exceptions being noted hereafter, and each has a general structural arrangement substantially identical to that of collector and discharger 150, but for their common horizontal orientation, drive shaft and drive motor. In essence, each is a substantial mirror image of the other. The differences that exist include collector and discharger 250 being provided with a solid material discharge orifice assembly 68 and, preferably, a proportioning valve 72, whereas tandem collector and discharger 350 carries neither of these components. Additionally, under normal operating conditions, collector and discharger 250 may be narrower than collector and discharger 350, as shown, and, accordingly, have an impeller 60 (not shown) with a blade width that is narrower than the blade width of impeller 60 (not shown) of its companion collector and discharger 350. Largely, any variations in the physical dimensions of the respective collectors and dischargers 250 and 350 will be determined by the desired rates of flow, pressures and the like that are to be maintained.

The operation of the tandem, swept orifice collector and discharger arrangement 200 of FIGS. 6 and 7 proceeds by introducing the admixture or entrainment of refined lignocellulose material and pressurized gaseous fluid from the blow line of the refiner directly into the inlet conduit 252 of collector and discharger 250 and then, width an impeller 60 (not shown), continuously centrifugally separating and urging the received solid material toward the housings cylindrical side wall where it collects. Contemporaneously, the impeller continuously sweeps the collected solid material past the opening in the side wall orifice assembly 68, to prevent plugging of the opening, while a predetermined minor portion of the pressurized gaseous fluid in the housing blows the solid material through the presized orifice opening of collector and discharger 250, through proportioning valve 72, if used, and through conduit 256. Concurrently, the major portion of the separated gas or steam from the entrainment exits collector and discharger 250 through its gas outlet exit conduit 254.

The blown admixture or entrainment of solids and gas passes through the conduit 256 and enters discharger 350 via transition elements 258, connected to its inlet conduit 352, and impeller 60, housed in collector and discharger 350, continuously centrifugally separates and urges the received solid material towards its housings cylindrical side wall where it collects and is swept by the impeller through its solid material discharge conduit 356. Concurrently, the major portion of the separated gas or steam exits collector and discharger 350 through its gas outlet exit conduit 354.

Figure 8:
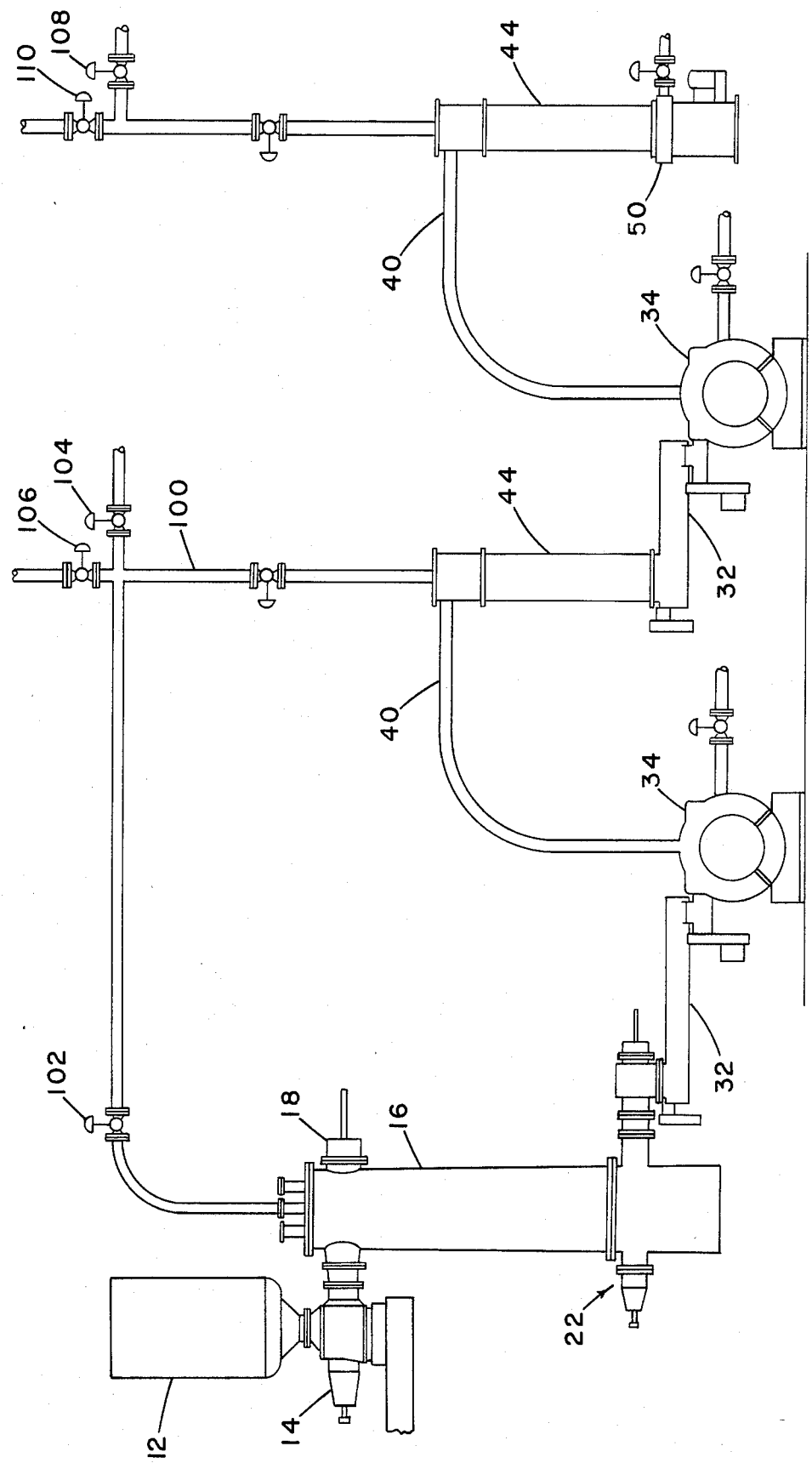
FIG. 8 is a typical, pictorial, double or two-stage refiner arrangement for pulping employing the collector and discharger apparatus of FIGS. 1 to 3, which is the preferred discharger apparatus for use in paper manufacture.
Figure 9:
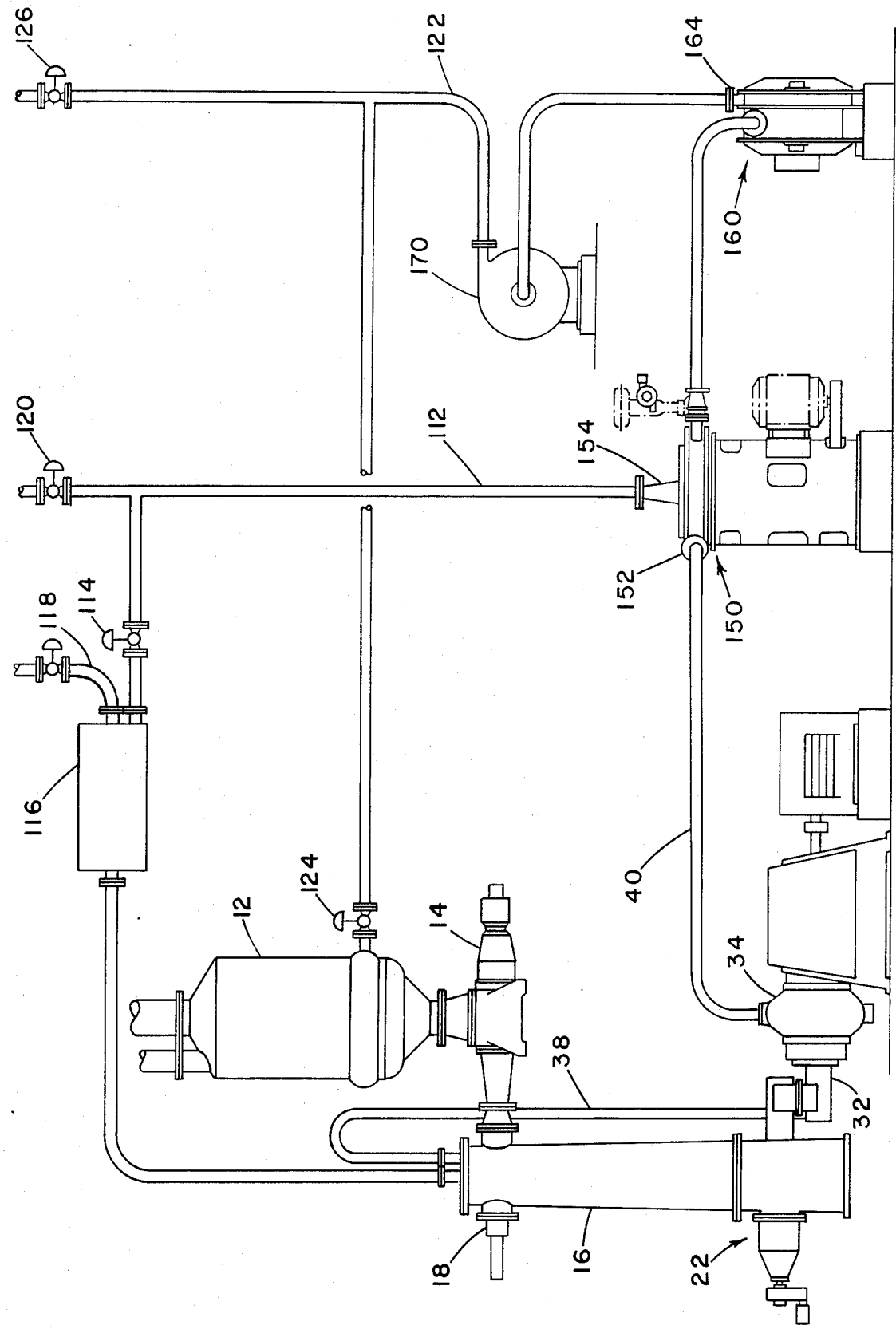
FIG. 9 is a typical, pictorial arrangement of a refiner pulping process using the swept orifice discharger of FIGS. 4 and 5 in combination with the separator of applicant's U.S. Pat. No. 4,253,857.
Figure 10:
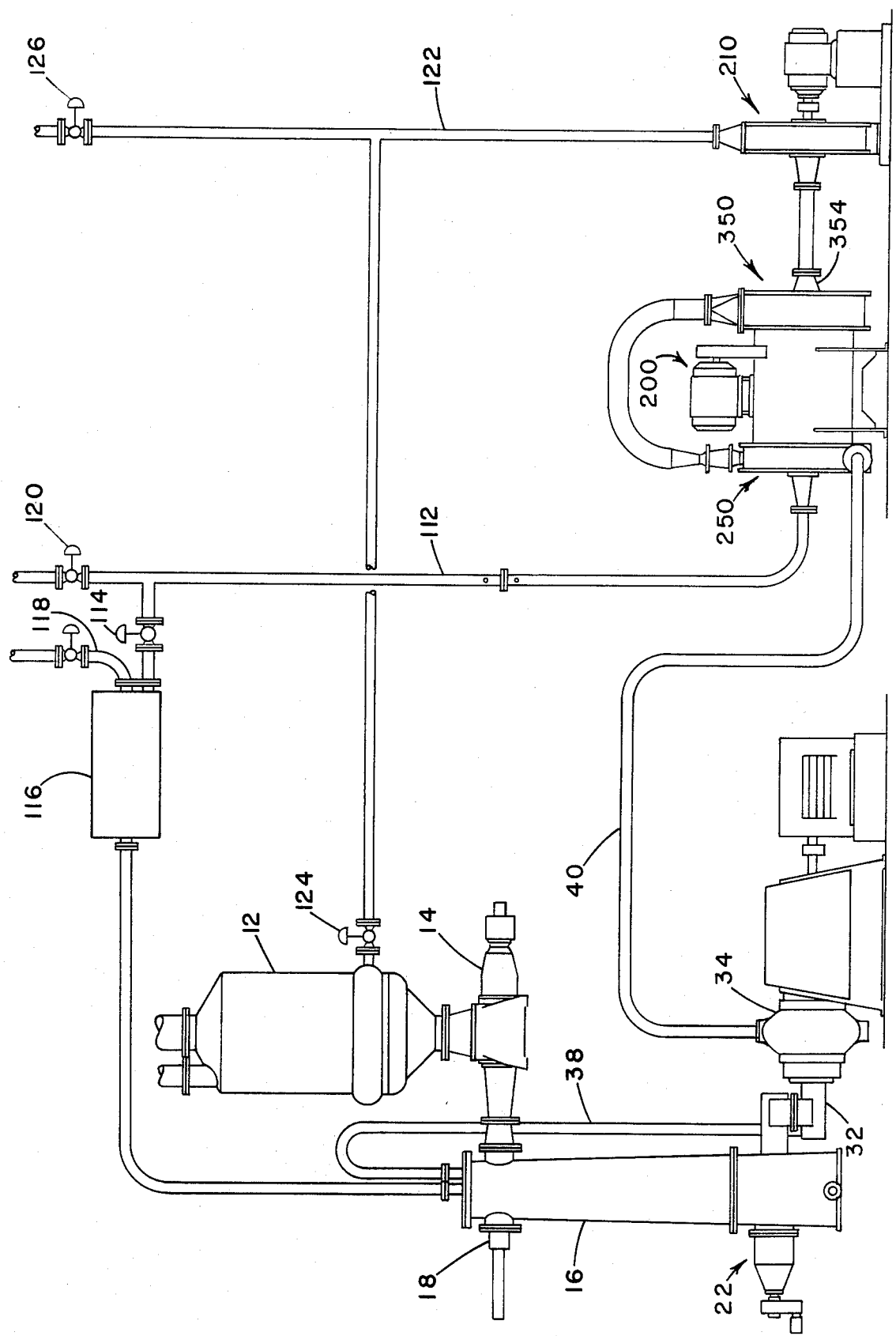
FIG. 10 is a typical, pictorial arrangement of a refiner pulping process using the tandem, two-stage, swept orifice discharger of FIGS. 6 and 7.

In FIGS. 8-10, shown pictorially are typical pressurized pulping process arrangements employing the principles of this invention. Insofar as possible, in these figures of drawing, like numerals as used above are employed to indicate like parts throughout the same.

In FIG. 8 is illustrated a double or two-stage refiner arrangement often preferred for paper pulping and the like and employing the collector and discharger apparatus of FIGS. 1–3. In this connection it should be noted that the blow line 40 of a first stage refiner 34 feeds a first stage cylone 44 which, in turn, feeds a second stage refiner 34, the blow line 40 of which then feeds a second stage cyclone 44, which is connected, as shown, to a swept orifice collector and discharger 50 of this invention. The operation of swept orifice collector and discharger 50 has previously been fully explained. What is to be further gleaned from FIG. 8 is that the gas exhaust from the first cyclone is shown being connected by process piping for recycling via conduit 100, through a valve 102, to steaming tube 16 or, through valve 104, to another or other processing lines or to atmospheric exhaust or, through valve 106, to a plant steam header (not shown), atmospheric exhaust or another or other processing lines. Additionally, the gas exhaust from the second cyclone is shown being connected by process piping for recycling, through valve 108, to another or other processing lines or to atmospheric exhaust or, through valve 110, to a plant steam header, atmospheric exhaust or another or other processing line, such as conduit 100. Accordingly, it will be understood to those skilled in the art that a complete or comprehensive system of recycling, bleed-off exhaust or full exhaust is contemplated in a manner such that the pressure of the gaseous fluid in the swept orifice collector and discharger can be continuously maintained at or near the system's elevated pressure.

In FIG. 9 is illustrated a single stage refiner arrangement often preferred for fiberboard or MDF pulping or the like and employing the collector and discharger apparatus 150 of FIGS. 4 and 5. It will further be understood that various components of the arrangement shown in FIG. 9, as well as throughout the drawings, are not necessarily shown in true proportion. The physical proportions shown are chosen for clarity of illustration only. The operation of swept orifice collector and discharger 150 has been fully explained above and should not require further explanation here. What needs explanation here is the illustrated incorporation in the system of the materials separator 160 of applicant's U.S. Pat. No. 4,253,857 and the general arrangement of the system piping and auxiliary equipment, so as to permit recycling or other use of the exhaust gas from collector and discharger 150 and separator 160, as well as maintaining the pressure of gaseous fluid in discharger 150 at elevated pressure.

In particular, the solids material discharged, including the entrained gas, from collector 150 is fed to the inlet of materials collector 160, the construction and operation of which can be found in U.S. Pat. No. 4,253,857, incorporated herein by reference. Generally, separator or second stage material collector and discharger 160 consists of a closed housing comprised of first and second axially aligned cylindrical chambers width chamber dividing wall means therebetween, rotor means extending axially through said housing and said first and second chambers, first blade means fixably mounted on said rotor means, said first blade means extending axially on said rotor means within said first chamber and being constructed and arranged to approach contact width the inner cylindrical wall of said first chamber, second blade means fixably mounted on said rotor means, said second extending axially on said rotor means within said second chamber, drive means for rotating said rotor means and first and second blade means, entrance means for charging the entrainment into said first chamber substantially tangent to the circumferential path of travel to said first blade means, discharge means in said first chamber for discharging solids separated from the entrainment, said discharge means being substantially tangent to the circumferential path of said first blade means, port means located centrally in said chamber dividing wall means for communicating entrainment gas in said first chamber with said second chamber and exit means in said second chamber for discharging said entrainment gas.

In use, the discharged collected solid material and the predetermined minor portion of pressurized gaseous fluid from collector and discharger 150 is passed to second stage collector and discharger 160 and is charged into its first chamber substantially tangent to the circumferential path of travel of its rotor. Separated solids are discharged from the first chamber substantially tangent to the circumferential path of travel of its rotor and the gaseous fluid is passed through the port in the dividing wall into the second chamber. The gaseous fluid is pumped through the second chamber and discharged therefrom under atmospheric or only slightly positive pressure. Pressure increase of the discharged gas, if desired for recycling, can be accomplished by any conventional gas pressure booster 170.

Referring now to the process piping arrangement of FIG. 9, shown is a conduit 112 connected to a gas outlet conduit 154 to convey the gas, through valve 114, to thermal compressor 116 and thence back to steaming tube 16 as a recycle gas. The construction and operation of thermal compressor 116 is well known and is basically a venturi device to increase gas pressure and which includes a high pressure gas line 118 connected thereto and to a high pressure gas source (not shown), such as a steam header or the like. Conduit 112 also has a branch line extending through valve 120 that may be connected to said header or another or other processing lines. Also shown is a conduit 122 connected to the gas outlet conduit 164 of collector and discharger 160 to convey the gas through valve 124 to chip bin or hopper 12 to preheat the lignocellulose chips. Alternatively, or in addition thereto, conduit 122 may convey the discharged gas from material separator 160 through its branch line and valve 126 to a header or the like or to another or other processing lines.

Considering now FIG. 10 there is shown the alternative use of a tandem, swept orifice collector and discharger 200 plus a gas pressure booster 210, such as a fan, in the pulp processing arrangement of FIG. 9. With the construction and operation of the tandem swept orifice apparatus 200 having been fully explained above, it will be obvious to those skilled in the art that pressure booster 210 is employed to function similarly to the pressure booster 170 following the collector and discharger 160, shown in FIG. 9, so as to increase the pressure of the gas exiting conduit 354 of collector and discharger 350. Since all else shown in FIG. 10 is the same as shown in FIG. 9, further description of this pulp processing embodiment is not deemed necessary.

What is claimed is:

1. A material collector and discharger apparatus for use in a system in which solid material is processed in a gaseous fluid environment maintained at an elevated pressure and an admixture of said solid material and said gaseous fluid at elevated pressure is conveyed from a cyclone separator to said collector and discharger apparatus, said apparatus comprising:

a housing having a cylindrical side wall closed at one end and open at the other end and constructed and arranged to receive said solid material and said gaseous fluid and to collect said solid material about the cylindrical side wall thereof, replaceable orifice means in said cylindrical side wall of said housing to discharge the collected solid materials, said orifice means having a selected sized orifice opening for controlled pressure discharge of the collected solid material with a predetermined minor portion of said pressurized gaseous fluid, rotary blade impeller means within said housing to centrifugally urge said solid material toward said housing cylindrical side wall, said impeller means having a blade width at its free end that is slightly narrower than the width of said cylindrical side wall and a blade reach closely approximating the inner diameter of said cylindrical side wall, the axis of said rotary blade impeller means being perpendicular to the axis of said replaceable orifice means, drive means for said impeller means, and said cyclone operatively connected to said housing to provide for the conveyance of said admixture of said solid material and said gaseous fluid at elevated pressure to said housing and to maintain the pressure of said gaseous fluid in said housing at an elevated pressure.

2. The apparatus of claim 1 in which a proportioning valve means is positioned and arranged with respect to said orifice opening such that said proportioning valve means selectively modulates said orifice opening.

3. The apparatus of claim 1 in which said orifice means is in flow communication with a second stage material collector and discharger so as to discharge entrained gas thereto said second stage material collector and discharger comprising:

a closed housing, said closed housing comprised of first and second axially aligned cylindrical chambers with chamber dividing wall means therebetween, rotor means extending axially through said closed housing and said first and second chambers, first blade means fixably mounted on said rotor means, said first blade means extending axially on said rotor means within said first chamber, said first blade means being constructed and arranged to approach contact with the inner cylindrical wall of said first chamber, second blade means fixably mounted on said rotor means, said second blade means extending axially on said rotor means within said second chamber, drive means for rotating said rotor means and said first and second blade means, entrance means for charging the entrainment gas into said first chamber substantially tangent to the circumferential path of travel of said first blade means, discharge means in said first chamber for discharging solids separated from the entrainment gas, said discharge means being substantially tangent to the circumferential path of travel of said first blade means, port means located centrally in said chamber dividing wall means for communicating the entrainment gas in said first chamber with said second chamber, and exit means in said second chamber for discharging said entrainment gas.

4. The apparatus of claim 1 in which said orifice means discharges to a tandem driven second stage material collector and discharge apparatus so as to discharge entrained gas thereto, said tandem driven second stage material collector and discharge apparatus comprising:

a second housing having a cylindrical side wall closed at one end and open at the other end, inlet means in said cylindrical side wall of said second housing, conduit means interconnecting said orifice means to said inlet means to convey said discharged entrainment gas thereto, rotary blade impeller means within said second housing to centrifugally urge said solid material toward its cylindrical side wall, said impeller means having a blade width at its free end that is slightly narrower than the width of said cylindrical side wall of said second housing and a blade reach closely approximating the inner diameter of said cylindrical side wall of said second housing, discharge means in said cylindrical side wall of said second housing for discharging solid material separated from the entrainment gas, and exit means connected to said open end of said second housing to remove said gaseous fluid therefrom.

* * * * *